United States Patent
Morii et al.

(10) Patent No.: US 8,881,391 B2
(45) Date of Patent: Nov. 11, 2014

(54) METHOD FOR PRODUCING HOLLOW ENGINE VALVE

(75) Inventors: Hirokazu Morii, Tokyo (JP); Hyoji Yoshimura, Nagoya (JP)

(73) Assignees: Mitsubishi Heavy Industries, Ltd., Tokyo (JP); Yoshimura Company, Nagoya-Shi (JP)

( * ) Notice: Subject to any disclaimer, the term of this patent is extended or adjusted under 35 U.S.C. 154(b) by 0 days.

(21) Appl. No.: 13/504,877

(22) PCT Filed: Sep. 24, 2010

(86) PCT No.: PCT/JP2010/066479
§ 371 (c)(1),
(2), (4) Date: Jun. 27, 2012

(87) PCT Pub. No.: WO2011/104916
PCT Pub. Date: Sep. 1, 2011

(65) Prior Publication Data
US 2012/0255175 A1    Oct. 11, 2012

(30) Foreign Application Priority Data
Feb. 26, 2010   (JP) ................. 2010-041410

(51) Int. Cl.
*B21K 1/20*   (2006.01)
*B21K 1/22*   (2006.01)
*F01L 3/14*   (2006.01)
*F01L 3/00*   (2006.01)
*B21C 23/18*  (2006.01)
*B23P 15/00*  (2006.01)

(52) U.S. Cl.
CPC ... *F01L 3/00* (2013.01); *B21K 1/22* (2013.01); *F01L 3/14* (2013.01); *B21C 23/183* (2013.01); *B23P 15/002* (2013.01)

USPC ................. 29/888.45; 29/888.4; 29/888.451; 29/890.12; 72/349; 72/256; 72/352; 123/188.2; 123/188.3

(58) Field of Classification Search
USPC .............. 29/888.4, 888.45, 888.451, 890.12; 72/349, 256, 352; 123/188.2, 188.3
See application file for complete search history.

(56) References Cited

U.S. PATENT DOCUMENTS 2,411,734 A * 11/1946 Kerwin et al. ............. 123/188.1
2,440,461 A *  4/1948 Clements ................... 29/888.45

(Continued)

FOREIGN PATENT DOCUMENTS

CH        231293 A     3/1944
EP    0 619 419 A1    10/1994

(Continued)

OTHER PUBLICATIONS

STIC Search results.*

(Continued)

*Primary Examiner* — Jermie Cozart
*Assistant Examiner* — Ruth G Hidalgo-Hernande
(74) *Attorney, Agent, or Firm* — Birch, Stewart, Kolasch & Birch, LLP

(57) ABSTRACT

A method for producing a hollow engine valve is disclosed which involves gradually reducing the size of the outer diameter and inner diameter of a hollow shaft of a semi-finished product sequentially inserting the hollow shaft into a plurality of molding holes having different hole shapes so as to gradually extend the length of the hollow shaft, and forming the hollow shaft into a predetermined shape by sequentially performing a drawing process. The semi-finished product is subjected to heat treatment such that the hardness thereof is equal to or less than a predetermined hardness, and the maximum thickness between the hollow shaft and an umbrella portion connected to the bottom edge of the hollow shaft is formed to be thicker than the thickness of the hollow shaft by means of a molding hole of a die which is adjusted to have a specific length and maximum inner diameter.

2 Claims, 3 Drawing Sheets

(56) References Cited

U.S. PATENT DOCUMENTS

| | | | | |
|---|---|---|---|---|
| 2,471,937 A | * | 5/1949 | Colwell | 29/888.451 |
| 2,731,708 A | * | 1/1956 | Kubera | 29/888.451 |
| 3,186,209 A | * | 6/1965 | Friedman | 72/334 |
| 5,054,195 A | * | 10/1991 | Keck et al. | 29/888.453 |
| 5,056,219 A | * | 10/1991 | Iwase | 29/888.451 |
| 5,413,073 A | * | 5/1995 | Larson et al. | 123/188.3 |
| 6,139,660 A | * | 10/2000 | Nagashima et al. | 148/677 |
| 6,161,285 A | * | 12/2000 | Eberhardt et al. | 29/888.451 |
| 2009/0266314 A1 | * | 10/2009 | Uchiyama et al. | 123/41.16 |

FOREIGN PATENT DOCUMENTS

| | | | |
|---|---|---|---|
| EP | 0911493 A2 | * | 4/1999 |
| EP | 1640086 A1 | * | 3/2006 |
| EP | 1 950 384 A1 | | 7/2008 |
| JP | 125613 C2 | | 7/1938 |
| JP | 3-18605 A | | 1/1991 |
| JP | 2008-267202 A | | 11/2006 |
| JP | WO2007/057946 A1 | | 5/2007 |
| JP | 2009-293465 A | | 12/2009 |
| JP | 4390291 B1 | * | 12/2009 |
| JP | 4390291 B1 | | 12/2009 |
| WO | WO 2010/032799 A1 | | 3/2010 |

OTHER PUBLICATIONS

European Search Report issued in European Application No. 10846579.0 on Sep. 13, 2013.

* cited by examiner

METHOD FOR PRODUCING HOLLOW ENGINE VALVE

BACKGROUND OF THE INVENTION

1. Field of the Invention

The present invention relates to a method for producing a hollow engine valve designed to have an increased strength and a reduced weight.

2. Description of the Related Art

Among engine valves, various engine valves designed as follows are recently provided along with the increase in output and performance of an engine. An inside of the engine valve is formed to be hollow and this hollow portion is filled with metallic sodium serving as a coolant. This design reduces the weight, and improves the thermal conductivity by the action of metallic sodium filled in the hollow portion, compared to a solid engine valve. A conventional method for producing such a hollow engine valve is disclosed in, for example, Patent Document 1.

PRIOR ART DOCUMENT

Patent Document

Patent Document 1: Japanese Patent No. 4390291

SUMMARY OF THE INVENTION

Problems to be Solved by the Invention

When an engine valve is closed, a valve umbrella portion thereof comes into contact with a valve seat with great force. In addition, an engine valve for exhaust valve in particular is continuously heated by a high-temperature exhaust gas. Hence, a large load is applied to a neck portion being a connection portion between the valve umbrella portion and a hollow stem portion. When the engine valve is produced to be hollow, the problems described above become more notable and may cause an engine failure. Incidentally, the conventional manufacturing method described above is not for a hollow engine valve for which measures against the above problems have been taken.

The present invention has been made to solve the problems described above, and an object thereof is to provide a method for producing a hollow engine valve by which a hollow engine valve designed to have an increased strength and a reduced weight can be easily produced.

Means for Solving the Problems

In a method for producing a hollow engine valve according to a first aspect of the invention for solving the aforementioned problems, in which a hollow stem portion of a semi-finished product is shaped into a predetermined shape by sequentially inserting the hollow stem portion into a plurality of shaping holes different in hole shape to sequentially draw the hollow stem portion in such a way that an outer diameter dimension and an inner diameter dimension of the hollow stem portion are reduced stepwise and a length of the hollow stem portion is increased stepwise, the method for producing a hollow engine valve is characterized by comprising: subjecting the semi-finished product to heat treatment in such a way that a hardness of the semi-finished product becomes equal to or less than a predetermined hardness; and making a wall thickness of a portion between the hollow stem portion and a valve umbrella portion connected to a lower end of the hollow stem portion larger than a wall thickness of the hollow stem portion by using at least one of the shaping holes which has a hole length and a hole diameter adjusted.

The method for producing a hollow engine valve according to a second aspect of the invention for solving the aforementioned problems is characterized by further comprising adjusting a hole diameter of a valve umbrella shaping portion in each of the adjusted shaping holes, the valve umbrella shaping portion configured to shape the valve umbrella portion.

The method for producing a hollow engine valve according to a third aspect of the invention for solving the aforementioned problems is characterized by further comprising: injecting a coolant into the hollow stem portion after the drawing performed by using at least any one of the shaping holes; and sealing an opening portion of the hollow stem portion after the drawing performed by using the last one of the shaping holes.

The method for producing a hollow engine valve according to a fourth aspect of the invention for solving the aforementioned problems is characterized by further comprising sealing an opening portion of the hollow stem portion after the drawing performed by using any one of the shaping holes.

Effect of the Invention

In the method for producing a hollow engine valve of the present invention, the semi-finished product subjected to heat treatment in such a way that the hardness thereof becomes equal to or less than the predetermined hardness is shaped with the shaping hole in such a way that the wall thickness of the portion between the hollow stem portion and the valve umbrella portion is made larger than the wall thickness of the hollow stem portion, the shaping hole having the hole length and the hole diameter thereof adjusted. Hence, a hollow engine valve designed to have an increased strength and a reduced weight can be easily produced.

DETAILED DESCRIPTION OF THE INVENTION

A method for producing a hollow engine valve of the present invention is described below in detail by using the drawings.

Embodiment

Figure 3:
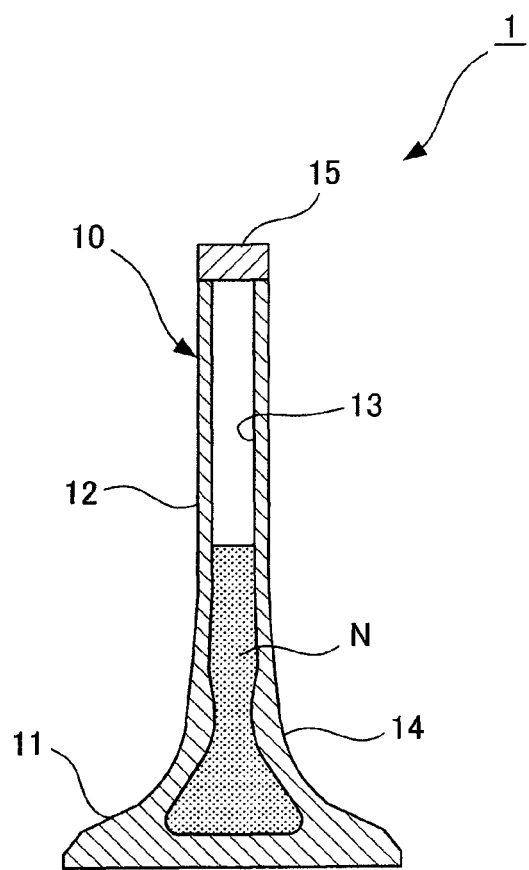
FIG. 3 is a vertical cross-sectional view of a hollow engine valve produced by the producing method of the present invention.

First, as shown in FIG. 3, a hollow engine valve 1 produced by the producing method of the present invention is one which is used as an intake valve or an exhaust valve of an engine in a vehicle or the like. The hollow engine valve 1 includes a valve body 10 into which metallic sodium N as a coolant is injected and a stem end sealing member 15 which is joined to a stem end of the valve body 10.

The valve body 10 is one in which a valve umbrella portion 11 and a hollow stem portion 12 are integrally shaped. A hollow hole 13 is formed in the inside of the valve body 10 to extend through the valve umbrella portion 11 and the hollow stem portion 12. Moreover, a neck portion 14 being a connection portion between the valve umbrella portion 11 and the hollow stem portion 12 is shaped such that the wall thickness of the thickest portion in the neck portion 14 is larger than the wall thickness of the hollow stem portion 12. Furthermore, the stem end sealing member 15 is joined to a base end (upper end) of the valve body 10 with metallic sodium N injected into the valve body 10.

Specifically, the valve body 10 is produced by using a cold forging apparatus 20 to be described later and the like. During the cold forging or after the cold forging, metallic sodium N is injected into the hollow hole 13. Thereafter, the stem end sealing member 15 is joined to the base end of the valve body 10 to close an opening portion of the hollow hole 13. Thus, the hollow engine valve 1 as a finished product can be obtained. Note that, the hollow engine valve 1 is sometimes not filled with metallic sodium N depending on usage conditions.

Figure 1:
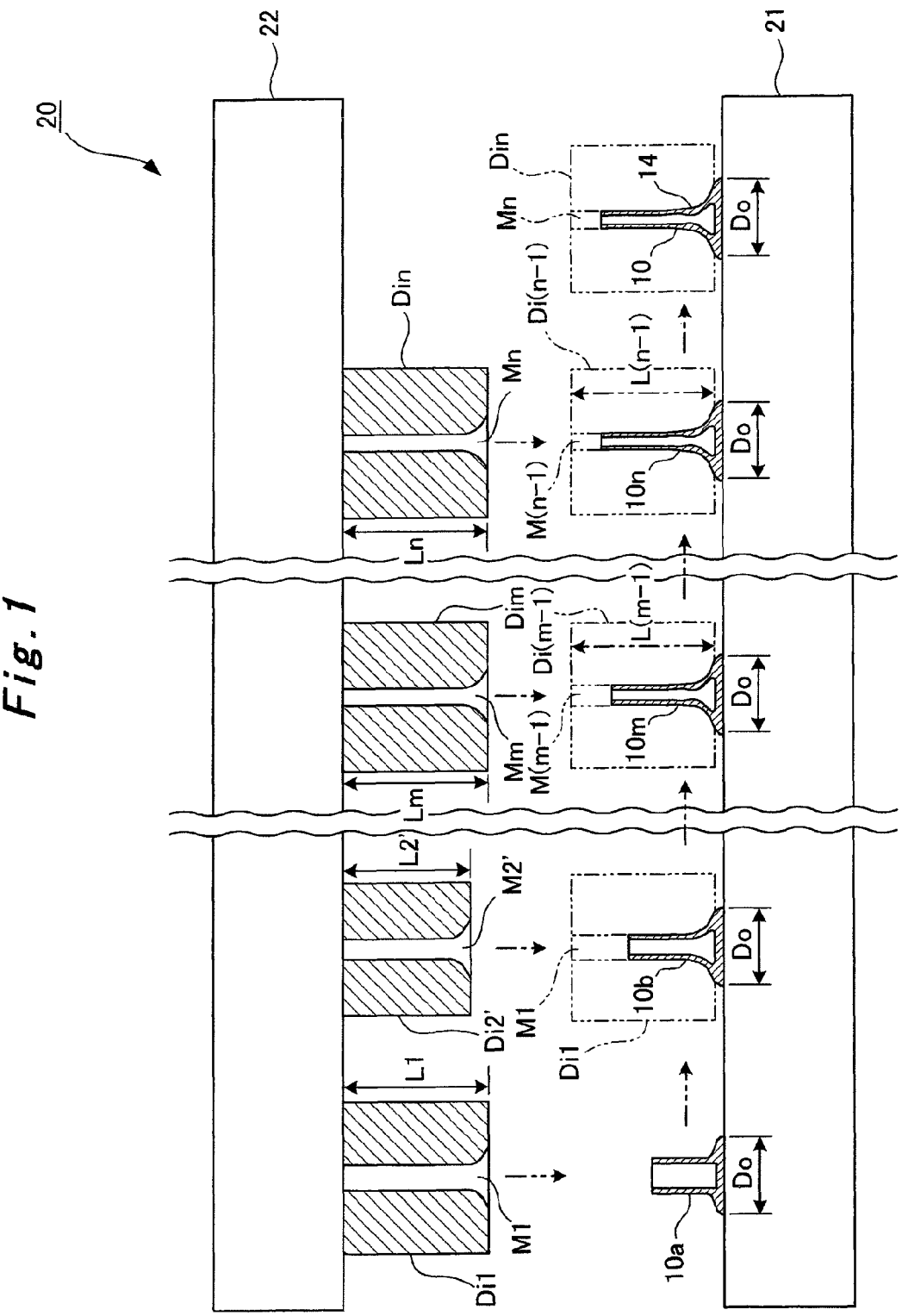
FIG. 1 is an overall configuration diagram of a cold forging apparatus to which a method for producing a hollow engine valve of the present invention is applied.
Figure 2A:
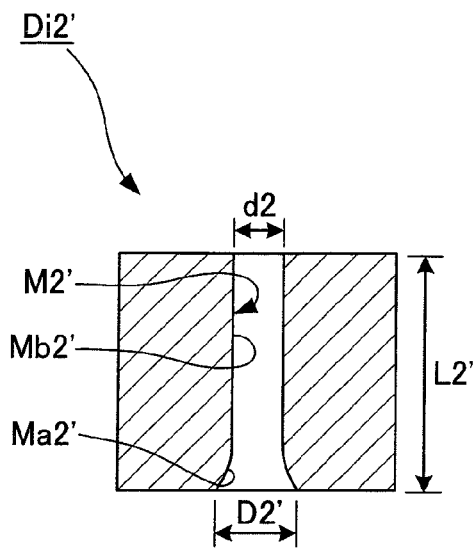
FIG. 2 Part (a) includes a vertical cross-sectional view of a die of the cold forging apparatus which is provided for a second drawing step and a vertical cross-sectional view of a semi-finished product shaped with the die, and Part (b) includes a vertical cross-sectional view of a die of the cold forging apparatus which has been conventionally provided for the second drawing step and a vertical cross-sectional view of a semi-finished product shaped with the die.
Figure 2A:
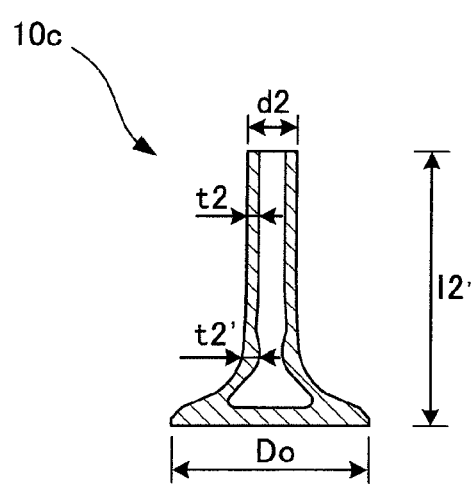
Figure 2B:
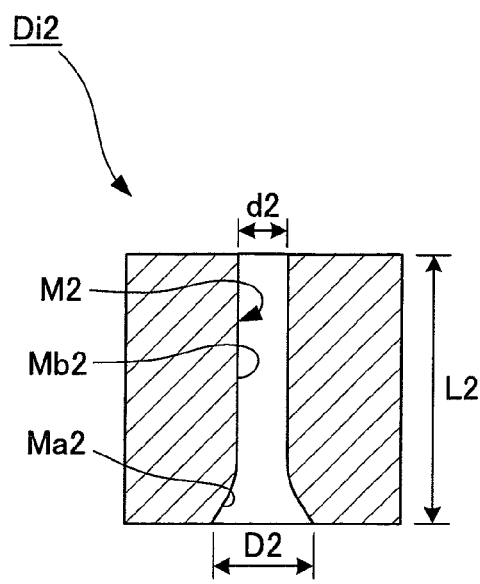
Figure 2B:
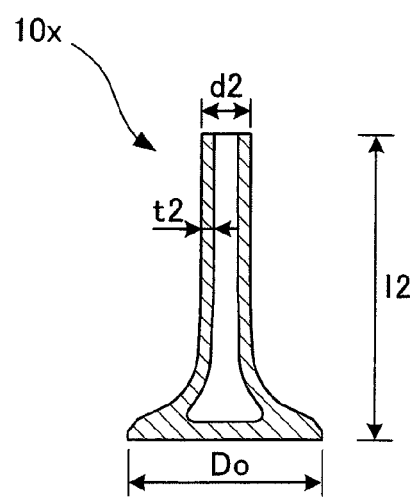

Next, the configuration of the cold forging apparatus 20 is described by using FIG. 1 and parts (a) and (b) of FIG. 2.

The cold forging apparatus 20 shown in FIG. 1 shapes the valve body 10 by sequentially drawing (cold-forging) a semi-finished product 10a. A press bed 21 is provided in a lower portion of the cold forging apparatus 20 while a ram 22 is provided in an upper portion of the cold forging apparatus 20 to face the press bed 21. The ram 22 is supported to be moveable in a vertical direction.

Tubular dies Di1, Di2', Di(m−1), Dim, Di(n−1), and Din are provided on a bottom face of the ram 22 in line along a conveyance direction of the semi-finished products. Here, index m refers to m-th in the order and index n refers to n-th (last) in the order. Moreover, m<n is satisfied and m and n are each a positive integer equal to or larger than 3.

Shaping holes M1, M2', M(m−1), Mm, M(n−1), and Mn each having a circular horizontal cross-section are opened respectively in center portions of the dies Di1, Di2', Di(m−1), Dim, Di(n−1), and Din. The shaping holes are formed such that the inner diameters thereof are gradually reduced as the shaping holes are located more downstream in the conveyance direction. Moreover, the lengths (depths) of the respective shaping holes M1, M2', M(m−1), Mm, M(n−1), and Mn are respectively L1, L2', L(m−1), Lm, L(n−1), and Ln, and the shaping holes are formed such that the lengths L1, L(m−1), Lm, L(n−1), and Ln are gradually increased as the shaping holes are located more downstream in the conveyance direction. In other words, these lengths are set such that L1<L(m−1)<Lm<L(n−1)<Ln is satisfied.

Meanwhile, semi-finished products 10a, 10b, 10c (see part (a) of FIG. 2), 10m, 10n, and the valve body 10 can be conveyed and positioned on the top face of the press bed 21 by using conveyance means which is not illustrated.

The die Di2' is described by using parts (a) and (b) of FIG. 2.

The die Di2' is used to draw the semi-finished product 10b shaped by the die Di1 and thereby obtain the semi-finished product 10c. In the semi-finished product 10c, the neck portion thereof is shaped in such a way that the wall thickness of the neck portion is made larger than the wall thickness of the hollow stem portion. Specifically, in the cold forging apparatus 20, the die Di2' is provided instead of a die Di2 which is used conventionally to shape a semi-finished product 10x in which the wall thickness is uniform through the neck portion and the hollow stem portion.

As shown in part (a) of FIG. 2, the shaping hole M2' of the die Di2' is formed to have the length of L2' and includes a shaping portion (valve umbrella shaping portion) Ma2' for eventually shaping an upper portion of the valve umbrella portion of the semi-finished product 10c and a shaping portion (stem shaping portion) Mb2' for shaping the hollow stem portion of the semi-finished product 10c, the shaping portion Mb2' formed continuously with an upper portion of the shaping portion Ma2'. The shaping portion Ma2' is formed to have an inner diameter of D2' at the largest portion while the shaping portion Mb2' is formed to have an inner diameter of d2.

The semi-finished product 10c is shaped to have a length (height) of 12' by performing drawing with the die Di2' described above. Furthermore, the hollow stem portion of the semi-finished product 10c is shaped to have a wall thickness of t2 while the neck portion of the semi-finished product 10c is shaped such that the thickest portion thereof has the wall thickness of t2' which is larger than the wall thickness t2. Incidentally, in the drawing with the die Di2', the shaping is possible until the wall thickness t2' of the thickest portion reaches a thickness about three times as large as (t2'≈3t2) the wall thickness t2.

Meanwhile, as shown in part (b) of FIG. 2, a shaping hole M2 of the die Di2 is formed to have a length of L2 which is larger than the length L2' (L2>L2'). The shaping hole M2 includes a shaping portion Ma2 for eventually shaping an upper portion of a valve umbrella portion of the semi-finished product 10x and a shaping portion Mb2 for shaping a hollow stem portion of the semi-finished product 10x, the shaping portion Mb2 formed continuously with an upper portion of the shaping portion Ma2. The shaping portion Ma2 is formed to have an inner diameter of D2, which is larger than D2' (D2>D2'), at the largest portion while the shaping portion Mb2 is formed to have an inner diameter of d2.

The semi-finished product 10x is shaped to have a length (height) of 12, which is larger than 12' (12>12'), by performing drawing with the die Di2 described above. Furthermore, the semi-finished product 10x is shaped such that the hollow stem portion and the thickest portion of a neck portion have the wall thickness of t2.

In other words, compared to the die Di2, the Die Di2' is set in such a way that the length L2' is smaller than the length L2 and the inner diameter D2' at the largest portion is smaller than the inner diameter D2 at the largest portion. By using this Die Di2', the semi-finished product 10c can be shaped in such a way that the wall thickness t2' of the thickest portion of the neck portion is made larger than the wall thickness t2 of the hollow stem portion.

The valve body 10 is produced as follows. First, a solid round bar-shaped material which is not illustrated is subjected to hot forging and the semi-finished product 10a is thereby shaped. Thereafter, the semi-finished product 10a is subjected to heat treatment in such a way that the hardness thereof becomes equal to or less than a predetermined hardness. Next, the semi-finished product 10a having the hardness equal to or lower than the predetermined hardness is positioned at a point on the press bed 21 of the cold forging apparatus 20 which corresponds to the die Di1.

Then, elevation and decent operations of the ram 22 and conveyance operations and positioning operations of the conveyance means are performed sequentially and n times of drawing are sequentially performed with the dies Di1, Di2', Di(m−1), Dim, Di(n−1), and Din. As a result, the semi-finished product 10a is sequentially shaped into the semi-finished products 10b, 10c, 10m, and 10n. This shaping causes the outer diameter dimension and the inner diameter dimension of each hollow stem portion to be reduced stepwise and the length of each hollow stem portion to be increased stepwise, and the valve body 10 is eventually formed.

Subjecting the semi-finished product 10a to heat treatment in such a way that the hardness thereof becomes equal to or less than the predetermined hardness has the following effect. In each of the semi-finished product 10a and the semi-finished products 10b, 10c, 10m, and 10n thereafter, it becomes easier to increase the wall thickness of the hollow stem portion and harder to increase the length of the hollow stem portion as the hardness of the semi-finished product becomes smaller.

By drawing the tempered semi-finished product 10b with the shaping hole M2' of the die Di2' adjusted to have the length of L2' and the inner diameter of D2' at the largest portion as described above, the semi-finished product 10c can be shaped in such a way that the wall thickness t2' of the thickest portion of the neck portion is made larger than the wall thickness t2 of the hollow stem portion. In the drawing with dies Di(m−1), Dim, Di(n−1), and Din, since hole shapes of the respective shaping holes M(m−1), Mm, M(n−1), and Mn of these dies are not adjusted from the conventional ones, the neck portion of each semi-finished product is shaped while the large wall thickness thereof is left as it is. Eventually, also in the valve body 10, the neck portion 14 is shaped in such a way that the wall thickness of the thickest portion is larger than the wall thickness of the hollow stem portion 12.

Incidentally, when the thickness t2' of the thickest portion of the neck portion does not reach the predetermined wall thickness with respect to the wall thickness t2 of the hollow stem portion by performing the drawing with the die Di2' once, the drawing is performed multiple times until the wall thickness t2' of the thickest portion reaches the predetermined wall thickness. Moreover, since the shaping holes M1, M2', M(m−1), Mm, M(n−1), and Mn do not press lower portions of the valve umbrella portions in the semi-finished products 10a, 10b, 10c, 10m, and 10n, the outer diameters at the largest portions of the valve umbrella portions are maintained at $D_o$.

Next, metallic sodium N is injected into the hollow hole 13 of the shaped valve body 10. Thereafter, the stem end sealing member 15 is joined to the base end of the valve body 10 to close the opening portion of the hollow hole 13. The hollow engine valve 1 as a finished product is thus produced.

Incidentally, in the cold forging apparatus 20, metallic sodium N can be injected after the drawing with any one of the dies Di1, Di2', Di(m−1), Dim, and Di(n−1). Moreover, in the case where no metallic sodium N is injected, the stem end sealing member 15 can be joined after the drawing with any one of the dies Di1, Di2', Di(m−1), Dim, Di(n−1), and Din.

By using the method, the following effects can be obtained. In the hollow engine valve 1 installed in an engine, the valve umbrella portion 11 comes into contact with a valve seat with great force and is heated to a high temperature. As a result, a large load is applied particularly to the neck portion 14. However, the strength of the neck portion 14 is improved by making the wall thickness of the thickest portion of the neck portion 14 larger and breakage of the hollow engine valve 1 can be thereby prevented. Moreover, the wall thickness is made as small as possible in the hollow stem portion 12 where a load is less likely to be applied. Thus, the hollow engine valve 1 can be reduced in weight.

Accordingly, in the embodiment, the hollow engine valve 1 designed to have an increased strength and a reduced weight can be easily produced.

INDUSTRIAL APPLICABILITY

The present invention can be applied to a hollow engine valve producing apparatus which is designed to produce hollow engine valves different in shape in a single producing apparatus by making dies replaceable.

The invention claimed is:

1. A method for producing a hollow engine valve in which a hollow stem portion of a semi-finished product is shaped into a predetermined shape by sequentially inserting the hollow stem portion into a plurality of shaping holes different in hole shape to sequentially draw the hollow stem portion in such a way that an outer diameter dimension and an inner diameter dimension of the hollow stem portion are reduced stepwise and a length of the hollow stem portion is increased stepwise, the method for producing a hollow engine valve comprising:

subjecting the semi-finished product to heat treatment in such a way that a hardness of the semi-finished product becomes equal to or less than a predetermined hardness; and making a wall thickness of a portion between the hollow stem portion and a valve umbrella portion connected to a lower end of the hollow stem portion larger than the wall thickness of the hollow stem portion and a wall thickness of an upper portion of the valve umbrella portion shaped by the shaping holes.

2. The method for producing a hollow engine valve according to claim 1, wherein the hole diameter is a hole diameter of a valve umbrella shaping portion in each of the adjusted shaping holes, the valve umbrella shaping portion configured to shape the valve umbrella portion.

* * * * *